US008332519B2

(12) United States Patent
Boyacigiller et al.

(10) Patent No.: US 8,332,519 B2
(45) Date of Patent: Dec. 11, 2012

(54) INVOKING MULTIPLE SIP BASED SERVICES DURING A SINGLE COMMUNICATION SESSION USING RESOURCE LISTS

(75) Inventors: Can Paul Boyacigiller, Annapolis, MD (US); Christopher Charles Dacombe, Ellicott City, MD (US); Praveen Babu Dharmavaram, Laurel, MD (US); Raghu Nandan, Rockville, MD (US); Sreenivasa R. Pamidala, Crofton, MD (US); Zhijian Pan, Clarksville, MD (US); Bouna Sall, Bowie, MD (US)

(73) Assignee: International Business Machines Corporation, Armonk, NY (US)

( * ) Notice: Subject to any disclaimer, the term of this patent is extended or adjusted under 35 U.S.C. 154(b) by 1264 days.

(21) Appl. No.: 11/844,751

(22) Filed: Aug. 24, 2007

(65) Prior Publication Data

US 2009/0052413 A1 Feb. 26, 2009

(51) Int. Cl.
*G06F 15/16* (2006.01)
(52) U.S. Cl. .............................. 709/227; 707/1; 716/6
(58) Field of Classification Search .................. 709/227
See application file for complete search history.

(56) References Cited

U.S. PATENT DOCUMENTS

| | | | |
|---|---|---|---|
| 6,888,828 B1 | 5/2005 | Partanen et al. | |
| 6,938,090 B2 | 8/2005 | Isomaki | |
| 7,114,146 B2* | 9/2006 | Zhang et al. | 717/106 |
| 2003/0224781 A1 | 12/2003 | Milford et al. | |
| 2004/0249951 A1 | 12/2004 | Grabelsky et al. | |
| 2005/0286540 A1 | 12/2005 | Hurtta et al. | |
| 2005/0289244 A1 | 12/2005 | Sahu et al. | |
| 2006/0034195 A1 | 2/2006 | Blaiotta et al. | |
| 2006/0104306 A1 | 5/2006 | Adamczyk et al. | |
| 2006/0268900 A1 | 11/2006 | Larsson et al. | |
| 2007/0002832 A1 | 1/2007 | Sylvain | |
| 2007/0043692 A1* | 2/2007 | Oh et al. | 707/1 |

OTHER PUBLICATIONS

James Snell, "The Web services insider, Part 4: Introducing the Web Services Flow Language," Jun. 1, 2001.*
Magedanz, T., et al., "The IMS Playground @FOKUS—An Open Testbed for Generation Network Multimedia Services", 1st Int'l Cont. on Testbeds and Research Infrastructures for the Development of Networks and Communities, Tridentcom 2005, pp. 2-11, Feb. 23-25, 2005. Drempetic, T., et al., "Next Generation Networks Architecture for Multimedia Applications", 4th EURASIP Conf. on Video/Image Processing and Multimedia Communications, vol. 2, pp. 563-568, Jul. 2-5, 2003.
Carstens, "Intermediate Application Server", IP.com No. IPCOM000145235D, Jan. 16, 2007.

* cited by examiner

*Primary Examiner* — Krista Zele
*Assistant Examiner* — Andrew Georgandellis
(74) *Attorney, Agent, or Firm* — Patents on Demand P.A.; Brian K. Buchheit; Scott M. Garrett

(57) ABSTRACT

The present invention discloses use of resource lists to invoke multiple services in an IMS environment. More specifically, SIP clients can exchange XML content with each other and/or with SIP servers that includes an XCAP resource list. A list entry can exist for each service that is to be included within a communication session. Each service specifying entry can include sub-attributes for the service, which comprise attribute-value pairs able to be read using standard conventions. Use of the resource lists alleviates a need to define a schema and write custom code each time a new service is developed. In one embodiment, additional nested XCAP resource lists can be used to define content that is to be shared among multiple services. For example, a resource list can be used to define a participant list, which is shared as common input data across the multiple services.

13 Claims, 2 Drawing Sheets

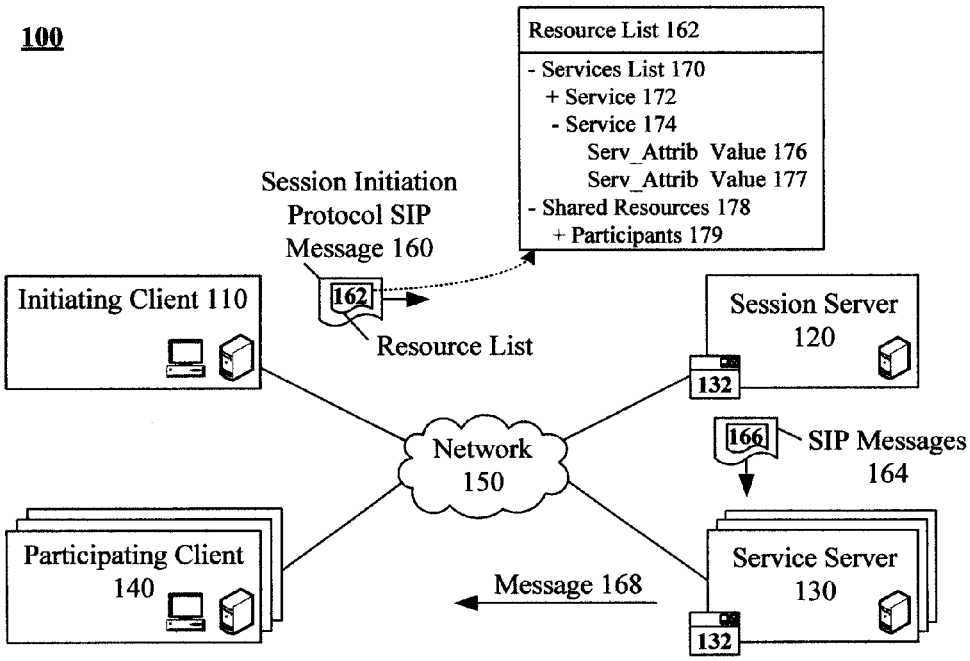

FIG. 1

```
                <?xml version="1.0" encoding="UTF-8"?>
Session Resource <resource-lists xmlns="urn:ietf:params:xml:ns:resource-lists"
   List 210             xmlns:xsi="http://www.w3.org/2001/XMLSchema-instance">
                    <list name="session">
   Conference      <list name="conference"
   Service 212            use-existing-session-participants="false">
                       <list name="participants">
Participant List 214      <entry uri="1234567890@example.com"  initiator="true">
                            <display-name> </display-name>
                          </entry>
                          <entry uri="sip:test.user1@10.10.3.100">         Participant
                            <display-name>Test User1</display-name>        Entries 216
                          </entry>
                          <entry uri="sip:test.user2@10.10.7.45">
                            <display-name>Test User2</display-name>
                          </entry>
                       </list>
                    </list>
                    <list name="game"
     Game                 game-name="MotorRacing"                    Participant Defining
     Service 218          title-id="3512"                                 Item 220
                          handset-id="641"
                          use-existing-session-participants="true">
                    </list>
                 </list>
               </resource-lists>
```

FIG. 2

INVOKING MULTIPLE SIP BASED SERVICES DURING A SINGLE COMMUNICATION SESSION USING RESOURCE LISTS

BACKGROUND

1. Field of the Invention

The present invention relates to the field of Internet Protocol Multimedia Subsystem (IMS) communication sessions and, more particularly, to invoking multiple Session Initiation Protocol (SIP) based services during a single communication session using resource lists.

2. Description of the Related Art

A demand for multimedia and data services across a broad range of communication devices has grown tremendously over the last few years. Mobile telephony devices, for example, commonly implement video on demand services, teleconferencing, dynamic movie sharing, co-browsing, music playing services, TV streaming services, and the like. A majority of the services for mobile devices are based upon a standardized architecture called the Internet Protocol (IP) Multimedia Subsystem (IMS). IMS is a flexible architecture, which is not limited to mobile devices, that is designed to permit a creation and delivery of real time multimedia services, which are independent of access media. IMS is based upon the Session Initiation Protocol (SIP), which is increasingly being used for a myriad of communications that amongst others includes Voice over Internet Protocol (VoIP) communications.

One current challenge with providing SIP based (IMS compliant) services involves invoking two or more different services during a common communication session. For example, an interactive video game provided as a SIP based service can be played from a graphical user interface (GUI) of a communication device, while a real-time communication channel (e.g., a different SIP based communication service) is concurrently active that permits game players to text or voice communicate with each other. In another example, a global positioning system (GPS) and media playing equipped smart phone can simultaneously utilize a navigation service and an audio streaming service, both of which are concurrently activate-able SIP based services.

Currently, developers often define an Extensible Markup Language (XML) schema for handling multiple services during a single communication session. Others simply pass text based data attachments within the actual SIP messages. Custom XML messages must be developed for each service of the defined schema. Thus, custom code must be written each time a new application that accesses multiple SIP based services is deployed. A need for customized code negates many of the advantages (e.g., independence of IMS services and access media) inherent in a standards based architecture, such as IMS. That is, using a set of application specific messages and an application specific schema results in a tightly coupled end product, where services are coupled to the application that invokes them. What is needed is a new, loosely coupled, standardized technique for concurrently invoking multiple SIP based services.

SUMMARY OF THE INVENTION

The present invention discloses the use of Extensible Markup Language (XML) Configuration Access Protocol (XCAP) resource lists to invoke one or more services in an Internet Protocol (IP) Multimedia Subsystem (IMS) environment. More specifically, SIP clients can exchange XML content with each other and/or with SIP servers that includes an XCAP resource list with nested lists. An entry can exist for each service that is to be included within a communication session. Each service specifying entry of the resource list can include sub-attributes for the service which comprise attribute value pairs able to be read using standard XML parsing conventions. Use of the resource lists would alleviate a need to define a schema and write custom code each time a new service is developed. In one embodiment, additional nested XCAP resource lists can be used to define content that is to be shared among multiple services. For example, a resource list can be used to define a participant list which is shared as common input data across the multiple services such as gaming and audio conferencing. Or in another embodiment, resource lists can be used to define common information about the initiator of the service that are passed to all the other services defined in the message.

The present invention can be implemented in accordance with numerous aspects consistent with the material presented herein. For example, one aspect of the present invention can include a method of initiating an IMS session using XCAP resource lists to define session participants and two or more services provided during the same SIP session. In the method, an XML session initiation message can be conveyed to an application server in a SIP message. The session initiation message can include a session resource list, which includes two or more service specific resource lists, and a participant list. Each service specific resource list can include a set of attribute-value pairs for providing a related service. The participant list can include one or more participant entries, each of which specifies a participant for a communication session. The application server can either consume this service specific initiation message and generate each of the different sessions needed itself, or it can generate two or more XML service initiation messages upon receiving the session initiation message. Each service initiation message can include one of the service specific resource lists and the participant list. The generated XML service initiation messages can be conveyed to service servers. Each service server can utilize the XML service initiation message to provide a service for the IMS session.

Another aspect of the present invention can include an XML compliant electronic document able to be stored in an electronic medium and conveyed over a network in a digitally encoded form within a carrier wave that could for example include two or more service resource lists and a participant list or other shared resource. Each service resource list can define specifics of a service to be provided during a multi-service IMS session. Each service resource list can include one or more attribute-value pairs that define parameters for invoking the related service. The participant list is one potential shared resource that can be used to define specifics of participants to be included in the IMS session. The participant list can include multiple participant entries each of which specify participant specific information, such as a Uniform Resource Identifier (URI) for a device to be used by a related participant for the IMS session.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 1 is a schematic diagram of a system for using a resource list contained within a SIP message to initiate an IP Multimedia Subsystem (IMS) session in which multiple services are provided in accordance with an embodiment of the inventive arrangements disclosed herein.

FIG. 2 is a code example showing XML contents of an XCAP resource list used to start an IMS session in accordance with an embodiment of the inventive arrangements disclosed herein.

DETAILED DESCRIPTION OF THE INVENTION

Figure 3:
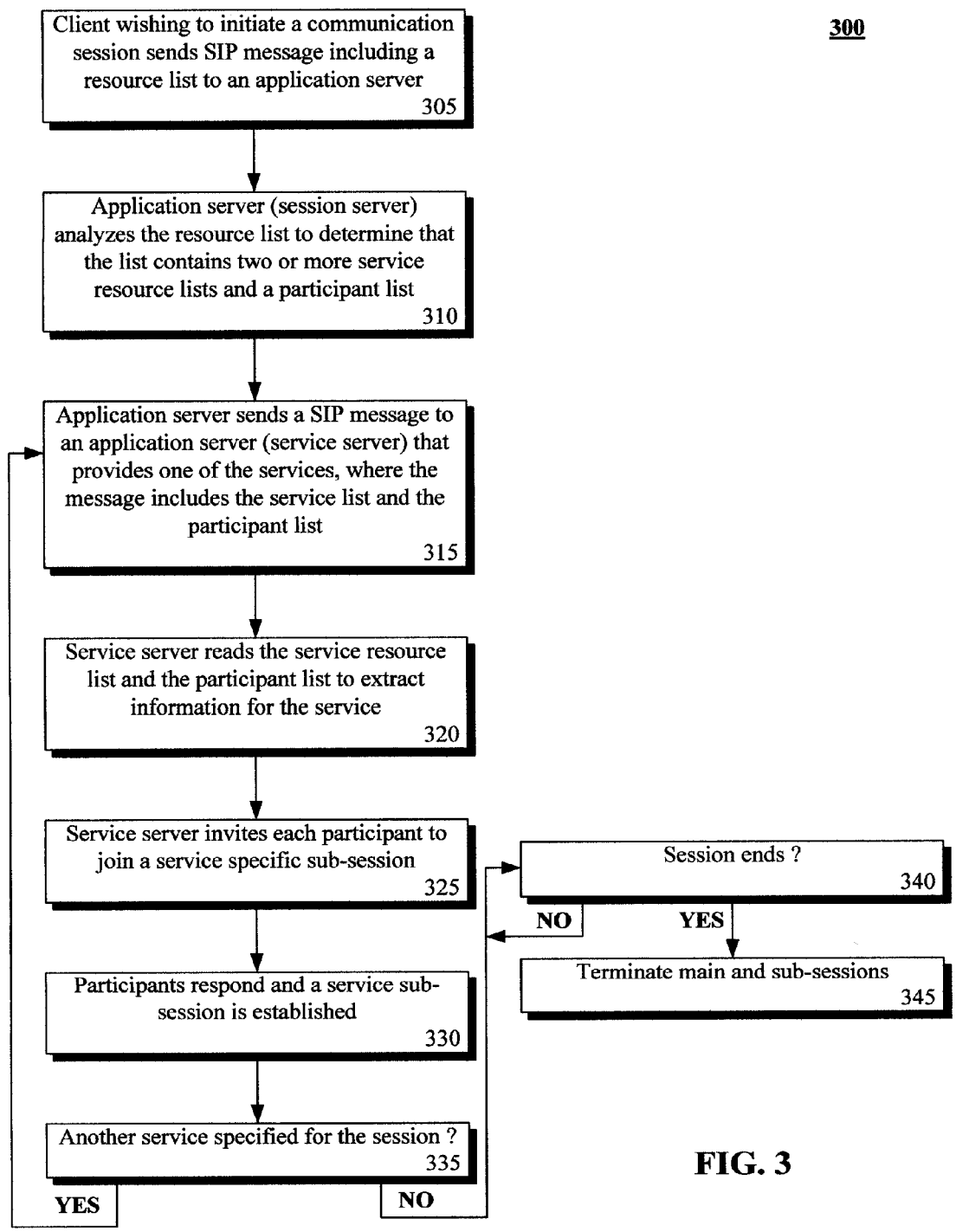
FIG. 3 is a flow chart of a method for invoking multiple SIP based services associated with a communication session using resource lists contained within SIP messages in accordance with an embodiment of the inventive arrangements disclosed herein.

FIG. 1 is a schematic diagram of a system 100 for using resource list 162 contained within a SIP message 160 to initiate an IP Multimedia Subsystem (IMS) session in which multiple services are provided in accordance with an embodiment of the inventive arrangements disclosed herein. Use of the resource list 162 can permit the multiple services 172-174 and participants 179 to be defined in a standardized manner that relies upon pre-existing protocols and schemas, which allows the resource list 162 to be easily utilized. Each of the services 172-174 can be defined in a nested fashion. For example, a session resource list 170 can include multiple service resource lists 172-174 as well as a shared resource list 178, which could, for example, include a participant list 179. An arbitrary and extensible number of attribute-value pairs 176-177 can be specified for each of the service lists 172-174 and participant list 179. Accordingly, use of the resource list 162 can eliminate a need to define a new Extensible Markup Language (XML) schema and write custom code each time a new service is developed. Additionally, use of the resource list 162 also permits multiple services to share common input data, such as sharing information 178, for example, concerning the set of participants 179.

As shown in system 100, an initiating client 110 can convey a Session Initiation Protocol (SIP) message 160 over network 150 to a session server 120. The SIP message 160 can contain the resource list 162 as message content. In one embodiment, the resource list 162 can be formatted in compliance with the XML Configuration Access Protocol (XCAP). The session server 120 can manage IMS sessions, such as the session initiated by message 160. Upon receiving the message 160, the session server can extract necessary information to generate additional SIP messages 164 also containing resource lists 166, which are sent to one or more service servers 130. Each resource list 166 can include one of the service specific lists 172 or 174 and the participant list 179. Each service server 130 can execute an application 132, which provides a service for the IMS session. Once the service server 130 receives the SIP message 164, participant 179 information can be extracted, which is used to determine a set of participating clients 140 to be invited 168 to join the IMS session.

In system 100, the session server 120 and the service servers 130 can each be application servers capable of managing SIP session details, capable of reading and interpreting resource lists 162 and 166, and capable of providing one or more services by executing a service specific application 132. In one embodiment, a single application server, such as server 120, can execute multiple applications 132 thereby providing multiple services to session clients 140. Whether a single server 120 or multiple distributed servers 120, 130 are used in system 100 is an implementation choice.

The initiating client 110 and participating clients 140 can be any computing device able to initiate or participate in an IMS session. For example, each of the clients 110, 140 can be a personal computer, a mobile telephone, a personal data assistant (PDA), a gaming console, and the like.

Network 150 can include components capable of conveying digital content encoded within carrier waves. The content can be contained within analog or digital signals and conveyed through data or voice channels and can be conveyed over a personal area network (PAN) or a wide area network (WAN). The network 150 can include local components and data pathways necessary for communications to be exchanged among computing device components and between integrated device components and peripheral devices. The network 150 can also include network equipment, such as routers, data lines, hubs, and intermediary servers which together form a packet-based network, such as the Internet or an intranet. The network 150 can further include circuit-based communication components and mobile communication components, such as telephony switches, modems, cellular communication towers, and the like. The network 150 can include line based and/or wireless communication pathways.

Although system 100 illustrates use of resources in an IMS context, the invention is not to be construed as limited in this regard. For example, a use of XCAP resource lists for conveying multiple applications and shared resources can be applied to SIP communications in a non-IMS environment, such as an enterprise environment. Resource lists as described can also be applied to an HTTP messaging environment, to Web services of a Service Oriented Architecture (SOA) environment (e.g., HTTP/SOAP/WSDL environment), and the like. In short, use of XCAP resource lists can be adapted and applied to any message transport system utilizing any set of messaging protocols.

FIG. 2 is a code example 200 showing XML contents of an XCAP resource lists used to start an IMS session in accordance with an embodiment of the inventive arrangements disclosed herein. In one embodiment, the resource list 162 can contain content, such as that of code example 200. It should be appreciated that the code example 200 is presented for illustrative purposes only and that the invention is not to be construed as limited in this regard.

The code example, can include a session resource list 210, which is named "session." List 210 can include a few nested lists, such as conference service list 212, participant list 214, and a game service list 218. The conference service list 212 and the game service list 218 can include any number of attribute-value pairs, which define service specifics. For example, the game service list 218 can include attribute-value pairs specifying a game name of MotorRacing, a title id of "3512," a handset id of "641," and the like. One of the attribute-value pairs of the game service 218 can be a participant defining item 220, which references the participant list 214.

The participant list 214 can include multiple participant entries 216. The entries 216 can define the specifics for communicating with each session participant. For example, entries 216 can define a URI for a device of each participant. The session initiating client, as shown in example 200, need not be a session participant. Participant entries 216 can define a display name for a participant and other participant specific data, which can be used by one or more of the service providing servers.

FIG. 3 is a flow chart of a method 300 for invoking multiple SIP based services associated with a communication session using resource lists contained within SIP messages in accordance with an embodiment of the inventive arrangements disclosed herein. The method 300 can be performed in the context of a system 100 or other IMS system.

The method 300 can begin in step 305, where a client wishing to initiate a communication session can send a SIP based initiation message to an application server. The content of the initiation message can include a resource list, which can be an XCAP resource list, as shown in FIG. 2. In step 310, the application server, which can be referred to as a session server, can analyze the resource list to determine that the list includes two or more nested service resource lists and a participant list. Each of the nested service resource lists can be associated with a sub-service to be invoked during the communication session. The participant list can include a set of participants for the communication session, which applies to each of the services.

In step 315, the application server can send a SIP based message to an application server, referred to as a service server. The service server can provide one of the services, which is a sub-service for the communication session that includes multiple services. Content of the SIP message sent to the service server can include one of the nested service resource lists and the participant list. It should be noted that it is also possible to send the whole resource list that includes both services and the participant list. The receiving service server can process those entries that are relevant to it. In step 320, the service server can read the service resource list and the participant list to extract information for the service. In step 325, the service server can invite each participant to join the service specific sub-session. In step 330, the participants can respond and the service sub-session can be established. In step 335, a determination can be made as to whether another service specified for the session needs to be processed. If so, the method can proceed from step 335 to step 315, where the session server can send a SIP message to a session server that handles the next service.

When no other services are specified for the session, the method can proceed from step 335 to step 340, where a check can be performed to see if the session has ended. If not, the communication session involving the multiple services can be conducted until termination, shown in method 300 by the looping of step 340. When the session ends in step 340, the method can proceed to step 345, where the main and sub-session can be terminated.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for handling multiple services within a Session Initiation Protocol (SIP) session comprising;
   invoking a plurality of Session Initiation Protocol (SIP) based services during a single communication session using an Extensible Markup Language (XML) Configuration Access Protocol (XCAP) resource list, wherein the XCAP resource list comprises a plurality of nested service lists, each of which corresponds to a particular one of the SIP based services being invoked;
   conveying the XCAP resource list within a SIP message between at least one client that is initiating the single communication session and a remotely located session server that manages the communication session;
   determining from the XCAP resource list a plurality of service servers, each of which corresponds to one of the SIP based services;
   conveying each of the nested service lists as an XCAP resource list within a SIP message to one of the service servers with which the conveyed nested services list is associated; and
   the service server to which each nested service list is conveyed reading the content of the conveyed nested service list to invoke one of the SIP based services for the single communication session.

2. The method of claim 1, wherein each of the SIP based services of the invoking step is associated with a corresponding entry of the XCAP resource list.

3. The method of claim 2, wherein each session specific entry of the XCAP resource list contains a set of sub-attributes for the service, said set of sub-attributes comprising standard attribute-value pairs which are read to determine specifics for invoking the service for the communication session.

4. The method of claim 1, wherein the XCAP resource list comprises a nested list containing additional shared resources.

5. The method of claim 4, wherein the nested list containing the additional shared resources is shared between the plurality of invoked SIP based services.

6. The method of claim 1, wherein the XCAP resource list conveyed from the client comprises a nested list containing additional shared resources such as participants who will be invited to join the single communication session, said method further comprising:
   conveying the nested list containing the participants to each of the service servers.

7. The method of claim 1, wherein said steps of claim 1 are steps performed automatically by at least one machine in accordance with at least one computer program having a plurality of code sections that are executable by said at least one machine, said at least one computer program being stored in a machine readable medium.

8. A method of initiating an Internet Protocol Multimedia Subsystem (IMS) session comprising:
conveying an XML session initiation message to an application server, wherein said session initiation message comprises a session resource list, said session resource list comprising a plurality of service specific resource lists and at least one nested shared resources list, each service specific resource list comprising a plurality of attribute-value pairs, each of said at least one nested shared resources list comprising a plurality of entries, each entry specifying additional shared resources for a communication session;
the application server initiating a multi-service IMS session for services defined by the service specific resource lists that involves a set of participants defined by participant entries;
the application server generating a plurality of XML service initiation messages upon receiving the XML session initiation message, each XML service initiation message comprising one of the service specific resource lists and at least one shared resources list;
conveying each generated XML service initiation message to a service server that provides a related service; and
each service server utilizing the XML service initiation message to provide the related service for the IMS session, wherein the related service is provided to a set of shared resources defined by the entries of the at least one shared resource list.

9. The method of claim 8, wherein the XML session initiation message is an XCAP compliant message.

10. The method of claim 9, wherein the XML session initiation message is an XCAP compliant message contained within a SIP message.

11. The method of claim 8, wherein said steps of claim 8 are steps performed automatically by at least one machine in accordance with at least one computer program having a plurality of code sections that are executable by the at least one machine, said at least one computer program being stored in a machine readable medium.

12. A computer program product comprising computer program code stored in a non-transitory storage medium, comprising:
computer program code that, when executed by a computing device, causes the computing device to invoke a plurality of Session Initiation Protocol (SIP) based services during a single communication session using an Extensible Markup Language (XML) Configuration Access Protocol (XCAP) resource list, wherein the XCAP resource list comprises a plurality of nested service lists, each of which corresponds to a particular one of the SIP based services being invoked;
computer program code that, when executed by a computing device, causes the computing device to convey the XCAP resource list within a SIP message between at least one client that is initiating the single communication session and a remotely located session server that manages the communication session;
computer program code that, when executed by a computing device, causes the computing device to determine from the XCAP resource list a plurality of service servers, each of which corresponds to one of the SIP based services; and
computer program code that, when executed by a computing device, causes the computing device to convey each of the nested service lists as an XCAP resource list within a SIP message to one of the service servers with which the conveyed nested services list is associated, resulting in each service server utilizing the XML service initiation message to provide the related service for the IMS session, wherein the related service is provided to a set of shared resources defined by the entries of the at least one shared resource list.

13. The computer program product of claim 12, wherein the computer program code causes the XML session initiation message to be an XCAP compliant message.

* * * * *